United States Patent [19]

Trame

[11] 4,205,036
[45] May 27, 1980

[54] METHOD OF MAKING SIMULATED THREE-DIMENSIONAL STAINED GLASS OBJECTS

[75] Inventor: Charles E. Trame, Mequon, Wis.

[73] Assignee: Everbrite Electric Signs, Inc., South Milwaukee, Wis.

[21] Appl. No.: 912,661

[22] Filed: Jun. 5, 1978

Related U.S. Application Data

[62] Division of Ser. No. 871,302, Jan. 23, 1978, Pat. No. 4,110,393.

[51] Int. Cl.² ............... B29C 17/00; B29D 9/00; B29F 1/00
[52] U.S. Cl. .................. 264/132; 264/135; 264/246; 264/250; 264/255; 264/267; 264/279; 264/320; 264/328; 427/276; 428/67
[58] Field of Search ............. 428/192, 195, 67, 13, 428/14, 38, 174, 203; 264/259, 245–247, 320, 322, 129, 132, 135, 250, 255, 134, 328, 267, 279, 269; 427/276

[56] References Cited

U.S. PATENT DOCUMENTS

| | | | |
|---|---|---|---|
| 3,287,193 | 11/1966 | Klein | 264/132 |
| 3,382,134 | 5/1968 | Powell | 428/38 |
| 3,900,641 | 8/1975 | Woodman et al. | 428/38 |
| 3,931,425 | 1/1976 | Kuroda | 428/38 |
| 4,009,309 | 2/1977 | Holt | 428/38 |
| 4,016,235 | 4/1977 | Ferro | 428/38 |
| 4,123,494 | 10/1978 | Evrard et al. | 264/328 |

Primary Examiner—W. E. Hoag
Attorney, Agent, or Firm—Ralph G. Hohenfeldt

[57] ABSTRACT

A method of making three-dimensional simulated stained glass objects from resins. A sheet of resin having the ornamental pattern of the object printed on it is preformed substantially to the shape of the object. The preform is inserted in an injection mold for being reinforced on one side or another with a thicker resin layer. Mounting flanges, bosses, ribs, interlocking joints and other mating configurations are formed with the reinforcing layer to enable combining a molded three-dimensional section with other three-dimensional sections to form more complex objects. The printing on the flat resin sheet is pre-distorted, as required, so that when it is formed to the contours of the object the printing will assume a proper undistorted form.

3 Claims, 16 Drawing Figures

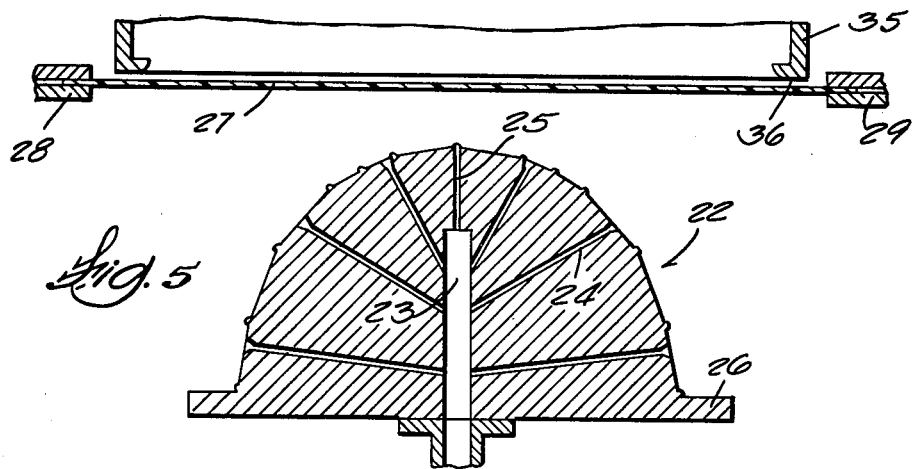
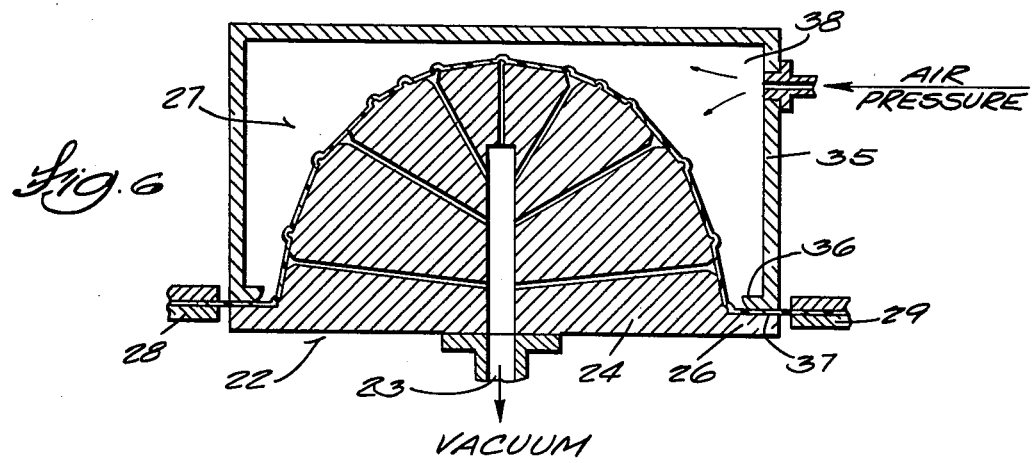
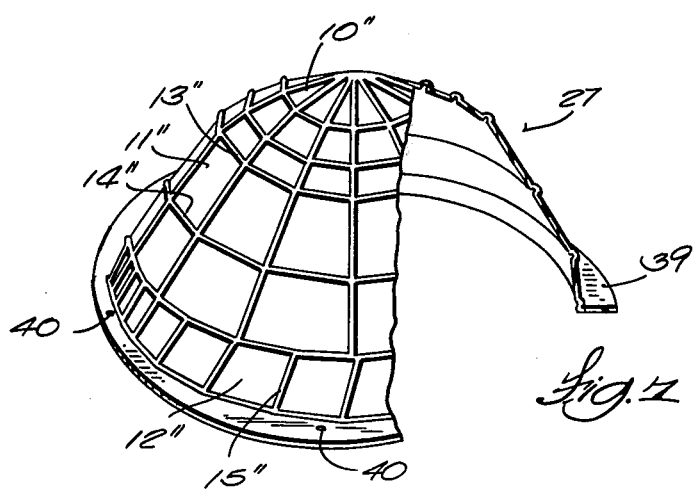

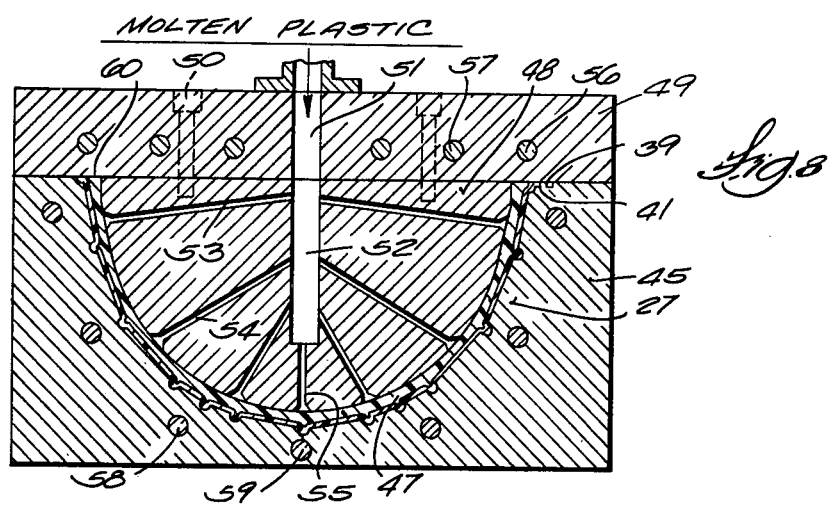
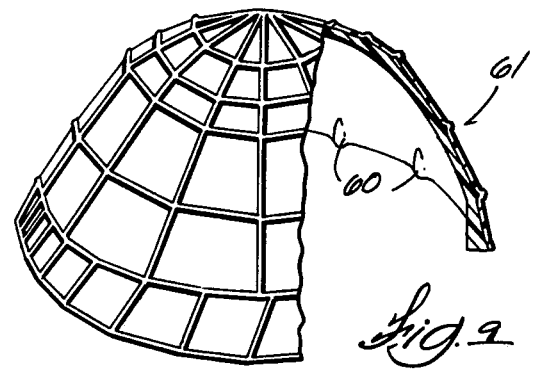
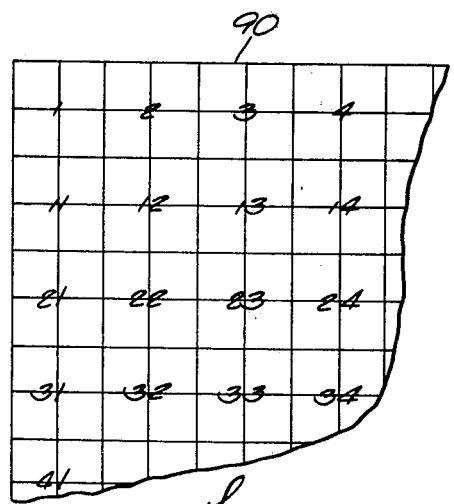
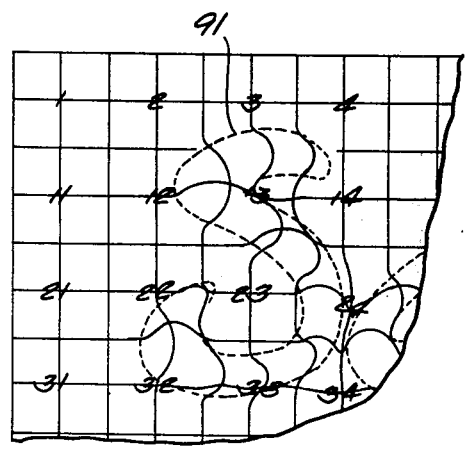

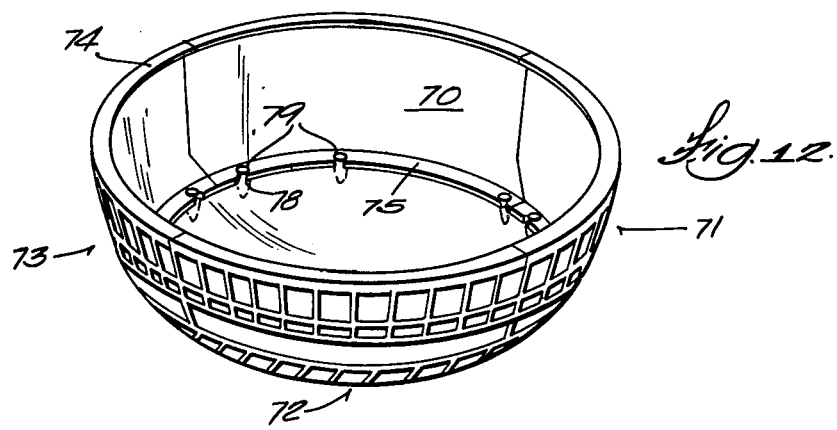
Fig. 12.
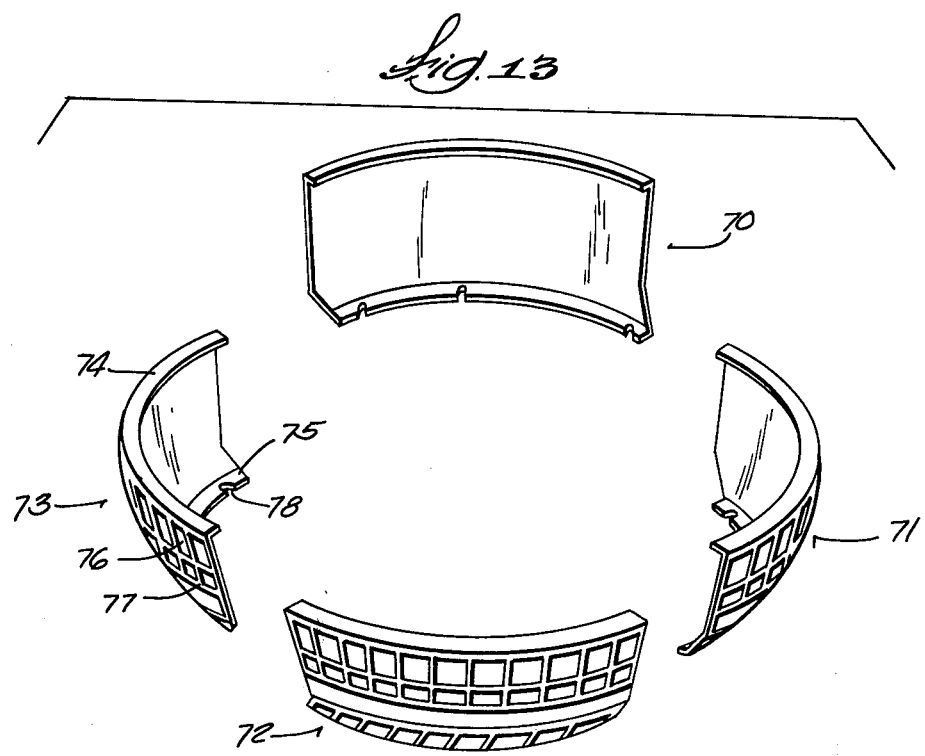
Fig. 13
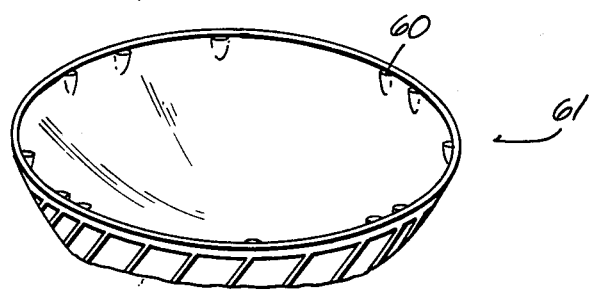

METHOD OF MAKING SIMULATED THREE-DIMENSIONAL STAINED GLASS OBJECTS

This is a division of application Ser. No. 871,302, filed Jan. 23, 1978, now U.S. Pat. No. 4,110,393.

BACKGROUND OF THE INVENTION

This invention relates to production of complex three-dimensional simulated stained glass objects from plastic materials.

An example of a simulated stained glass object which is made possible by the invention is a replica of the well-known Tiffany lamp shade which, in reality, is comprised of stained glass panes joined together with a low melting point metal such as lead solder. The method may be used to make simulated stained glass objects for advertising displays or decorative fixtures or furniture as further examples.

Production of substantially flat simulated stained glass panes has been achieved in the prior art as in U.S. Pat. No. 4,016,235. The method disclosed in this patent is suitable for making planar or two-dimensional simulated stained glass objects, such as window panes, where the only departure from the entire object lying in a single plane is the small relief that is required to simulate the lead joints between the facets corresponding with the glass chips in real stained glass panels as well as the texture typical of stained glass. The method of this patent involves printing a variously colored pattern of simulated stained glass facets and darkened simulated lead joints between them on a thin sheet of resin that is suitable for hot vacuum forming. The sheet is put in a mold cavity which has grooves corresponding with the pattern of the lead joints. A vacuum is drawn between one surface of the plastic sheet and the mold surface which has the grooves. A hot back-up layer of resin is then injected in the mold so as to force the thin printed sheet against the grooved die for producing an object which is essentially planar but has the necessary relief corresponding with the lead joints and glass texture. The thin printed resin sheet is not preformed before being placed in the injection mold. All forming is done in the injection mold under the influence of the high temperature and pressure of the injected resin. This method is not suitable for making the simulated stained glass objects which are grossly nonplanar to the extent of being hemispherical, or even spherical, as can be produced by the new method disclosed herein.

U.S. Pat. No. 3,122,598 is another prior art example of a method for making a decorated plastic or resin article such as a dinner plate which is basically two-dimensional as compared with the more pronounced third or depth dimension which is achievable with the new method disclosed herein. In this patent, the decoration or artwork is printed on a resin sheet that is quite thin. The sheet is then preformed to a limited extent by known vacuum or pressure methods to preshape it as required for the top surface of the plate. The preliminarily preformed sheet is then placed in a mold cavity, defined by spaced apart opposed mold faces, and hot resin is injected behind the sheet to form a base or substrate for the plate. This method is satisfactory for cases where the printed or decorative sheet does not undergo substantial deforming during the preforming process for, if it did, the decoration would be markedly distorted in the final product.

The problem of obtaining good registry between areas on the preformed object having relief with complementarily shaped recesses in the mold cavity is more acute when molding three-dimensional objects as contemplated by the invention than is the case where substantially planar objects are being molded as in the prior art. Insofar as is known, satisfactory molding of complex three-dimensional resin replicas of stained glass objects has not been achieved heretofore.

SUMMARY OF THE INVENTION

An object of this invention is to provide a method for molding resin replicas of multi-dimensional stained glass objects.

A further object is to provide a method of molding complex three-dimensional objects wherein the artwork or decorations are as accurately portrayed on the finished contoured object as would be obtained if the object were substantially planar.

Yet another object is to provide a method which enables highly contoured decorated molded parts or sections to be formed individually and then to join them with other sections to make large simulated stained glass objects such as globes and hemispherical lamp shades.

In accordance with one embodiment of the invention, making a replica of a three-dimensional stained glass object involves printing the variously colored decorations that are to appear undistorted in the finished object, such as a Tiffany type lamp shade or advertising display, on a resin sheet of significantly greater thickness than the films which have been traditionally employed in molding decorated objects that are more nearly planar. The art work is distorted on the sheet before it is preformed by various amounts in different areas as required for compensating the opposite distortion that results from stretching of the sheet by varying amounts during preforming. Thus, the art work in the final object is undistorted. The preformed plastic sheet is then disposed in a mold cavity and a substrate or backup layer is injection molded on one side or the other of the printed preform to further rigidify this part. The elements for joining the part with other parts to form a more complex object are created during the injection molding step. The preformed part is so dimensioned that it registers effectively with the mold cavity and undergoes only insignificant distortion even though shrinkage which is characteristic of hot molded resins occurs during the injection molding step.

How the foregoing and other more specific objects of the invention are achieved will appear in the more detailed description of an illustrative embodiment of the invention which will now be set forth in reference to the drawings.

DESCRIPTION OF THE DRAWINGS

FIG. 5 illustrates use of a male mold to preform a sheet of resin on which the designs or art work which is to appear on the finished simulated stained glass object is printed;

FIG. 6 illustrates the step of preforming the decorated resin sheet;

FIG. 7 is a perspective view, with a part broken away, of the decorative sheet after it is preformed as in FIG. 6;

FIG. 8 is a longitudinal section through an injection mold in which the preformed sheet has been located for having a backup layer or clear resin substrate injection molded to it;

FIG. 9 is a perspective view of the object, with a part broken away, after it has been removed from the injection mold of FIG. 8;

FIG. 10 shows a fragment of a plastic or resin sheet which has grid lines that are used for determining the amount of distortion that the sheet will undergo in a particular mold when it is subjected to preforming;

FIG. 11 illustrates the distorted appearance of the art work on the plastic sheet prior to it being preformed;

FIG. 12 is a simulated stained glass assembly comprised of parts or sections made by the same method which resulted in the object depicted in FIG. 9;

FIG. 13 shows an exploded view of the parts depicted in FIG. 12 and the parts depicted in FIG. 9 before they are assembled into a large object;

DESCRIPTION OF A PREFERRED EMBODIMENT

Figure 1:
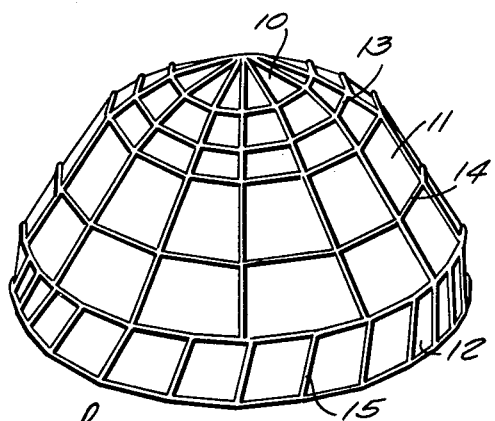
FIG. 1 is a nearly hemispherical model, made of true stained glass facets or chips with lead joints between them, which model could be a lamp shade of the Tiffany type or a part of a more complex illuminable advertising device such as a sign.

A preferred way of obtaining a true replica of a stained glass object is to make an original model out of true textured stained glass and lead joints. Such a model is depicted in FIG. 1. It is nominally hemispherical but may have oval, square, rectangular or other shapes and has a substantial depth and diameter. This object is much like a stained glass Tiffany type lamp shade but it is used herein as part of a more complex simulated stained glass object such as might be used in an advertising device. The object in FIG. 1 comprises a myriad of textured color stained glass segments or chips, hereafter called facets, such as those marked 10, 11 and 12. As usual, in handcrafted work of this type, the facets are joined with solder as typified by solder joints marked 13, 14 and 15. The soldered joints rise above or are in relief relative to the planes of the glass facets which they bound. The object in FIG. 1, of course, has a hollow interior.

Figure 2:
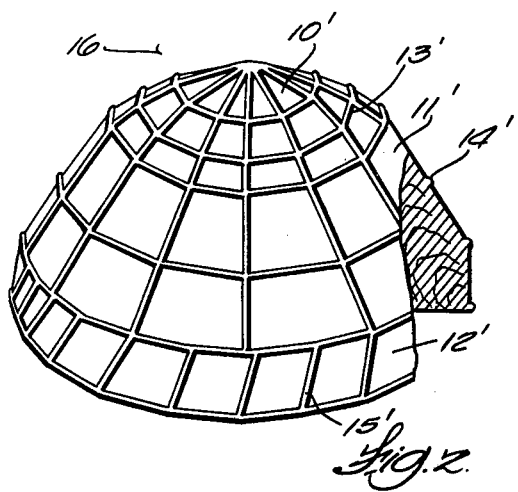
FIG. 2 is a wooden model corresponding, insofar as external contour and relief areas are concerned, with the original object shown in FIG. 1.

As in FIG. 2, a solid wooden model of the object shown in FIG. 1 is then made. For large objects that are made in sections for being assembled, a model would be made for each section. The model of the object or section in FIG. 1 faithfully reproduces the general shape and contours of the exterior of the original and has the flat areas corresponding with the simulated glass facets and it has relief corresponding with the lead joints between the flat facets. The texture of the facets on the wooden model in FIG. 2 is obtained by making individual molds, not shown, for each facet such as those marked 10–12 in FIG. 1. A thin plastic facet is then cast in each of the individual molds and, of course, the facets are then textured on at least one side. These thin textured facets are then adhered on the wood model of FIG. 2 so they can impart a corresponding texture to the facet areas in a model which is used to make the colored and textured preformed layer of the object as will be explained. Typically, epoxy resin can be used to cast the thin textured facets. In FIG. 2, parts which correspond with the same parts in FIG. 1 are given the same reference numerals except that a prime mark is added to them. The wooden model is generally designated by the reference numeral 16.

Figure 3:
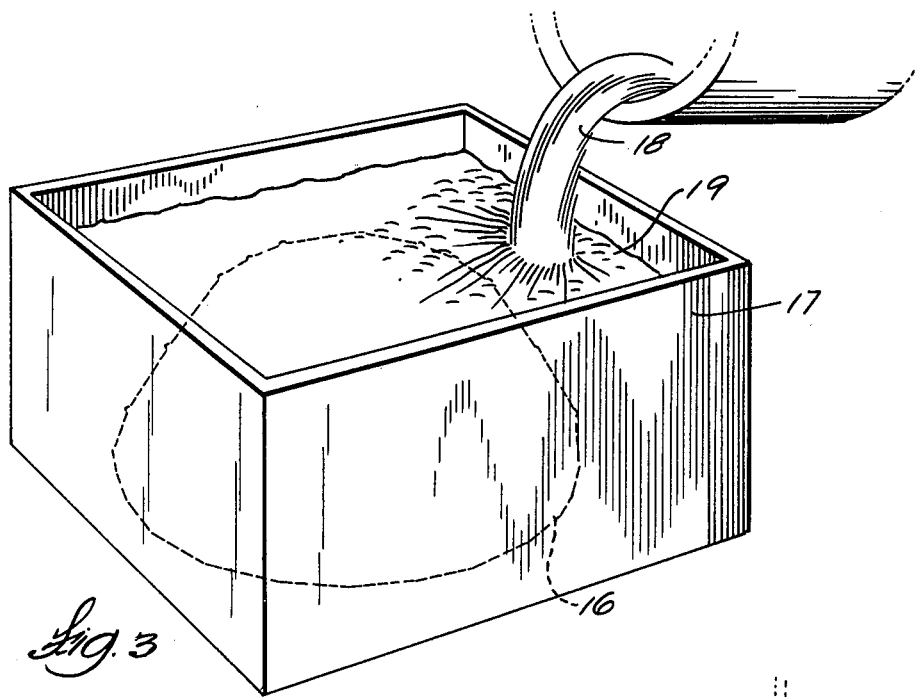
FIG. 3 illustrates the use of the model of FIG. 2 to form a female mold cavity.

Next, as in FIG. 3, a female mold is made using the model 16 of FIG. 2. The mold appears in outline in FIG. 3. The model is put in a container 17 and a slurry of ceramic material 18 is poured over the model, which is a known technique. After the body 19 of ceramic material sets, model 16 is withdrawn, leaving a female mold cavity which has internal surfaces that are complementary to the flat glass facet surfaces and the lead joint reliefs. In other words, the mold cavity is a negative of the model.

Figure 4:
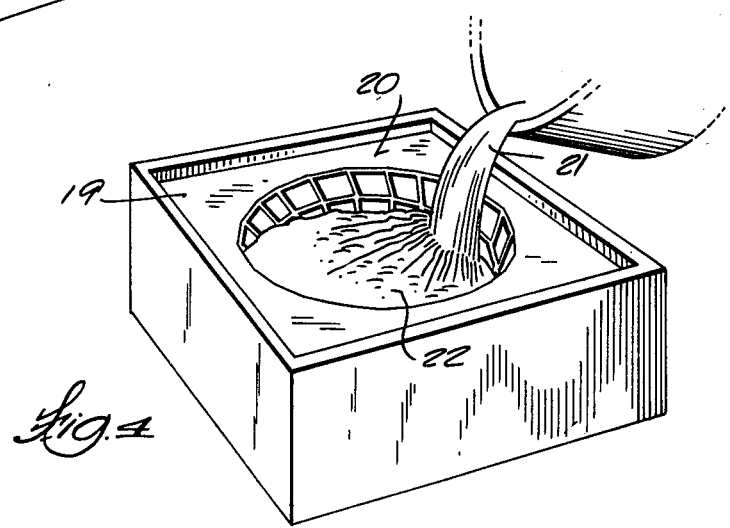
FIG. 4 illustrates use of the female mold cavity of the preceding figure to form a male mold.

The mold formed in FIG. 3 is used, as in FIG. 4, to form a male mold block. This is done by filling the mold cavity 20 with a fluid material 21 which will set or solidify in time. Various molding materials 21 known in the molding art may be used. If the production run of molded parts or objects is to be relatively small, a relatively inexpensive but less durable molding material such as rubber may be used. If, on the other hand, many parts are to be made, a more durable and dimensionally stable material such as berrylium alloy may be used. The partially formed male mold block in FIG. 4 is marked 22 but it will be understood that cavity 20 is completely filled to form the final male mold.

FIG. 5 depicts the male mold block 22 in cross section. Its external contour and texture are identical to the external contour and texture of the original model shown in FIG. 1. The solid male mold block in FIG. 5 is typically provided with a central bore 23 from which several holes such as 24 and 25 radiate to the surface. Bore 23 is for being connected to a vacuum source, not shown, which is required for vacuum preforming. Note that the mold 22 in FIG. 5 has an integrally cast radially extending flange 26. The synthetic resin and as yet unformed sheet 27 bearing printed art work resembling stained glass in color and configuration is shown supported horizontally over die 22 and clamped between the jaws 28 and 29 of a vertically movable frame. The frame carrying jaws 28 and 29 is vertically movable so as to bring the plastic sheet 27 downwardly to stretch it over the outside surface of male mold 22. Prior to doing this, hot air, gas or radiant heat is projected on plastic sheet 27 to make it more pliable and conformable to the male mold 22 during the next part of the preforming operation which is depicted in FIG. 6.

Various resins may be used for the transparent film or sheet 27 which is to have the art work on it and is to be preformed. A sheet comprised of polyvinyl chloride, which is thermoplastic resin and susceptible to thermoforming, has been used successfully. Typical other resins which could be used are acrylic, styrene acetate, butyrate, polycarbonate, ABS (acrylonitrile-butadiene-styrene) copolymers, and polyolefins including polyethylene and polypropylene. An important aspect of the present invention is that an unusually thick sheet is used, in the range of 0.015 inch to 0.025 inch thick but preferably about 0.020 inch thick.

The temperature of the sheet during preforming will depend on the resin used but most generally will be between 275° F. and 400° F. Those skilled in the molding art will be able to determine the proper temperature and pressure conditions for preforming so as to avoid melting and to enable quick cooling so the preformed part may be removed from the mold in a set condition.

FIG. 6 shows the final preforming step. The frame having jaws 28 and 29 is moved downwardly in synchronism with a housing 35 which has an inwardly extending flange 36 that stretches the warmed plastic sheet 27 as it is being brought down over the mold 22 and clamps the flange or edge 37 of the sheet. At the beginning of this preforming step in FIG. 6, bore 23 is subjected to vacuum which is communicated to all of the radially extending holes, such as the one marked 24, so that the underside of sheet 27 is presented toward a negative pressure area. At the proper time, that is, just as the internal housing flange 36 clamps and seals the edge 37 of the sheet by reaction against flange 26 of the die, air pressure is applied to the interior 38 of chamber 35. Evacuating the air under the sheet 27 assures that no air pockets will be formed between the sheet and the curved surface of mold 22 which could resist the externally applied air pressure. This results in the sheet developing a general configuration and other contours which are faithful reproductions of the contour and texture of the male mold 22. That is, the formed sheet 27 will have a generally hemispherical shape, and, as in FIG. 7, showing the formed sheet removed from the mold, its flat colored facets such as 10″, 11″ and 12″ will be formed and ridges or relief strips such as 13″ and 15″ will be formed. As stated above, in accordance with the invention, a relatively thick and rigid plastic sheet 27 is used such that the preformed product which results from the steps taken in connection with FIG. 6 and is shown in FIG. 7 will be rigid and not easily deformed. It will be appreciated by those skilled in the art of molding that the preforming mold, instead of being a male mold as in FIG. 5, could have been devised as a female mold as well.

The preformed sheet 27, which is now a hemispherical shell, is depicted in FIG. 7. Because of methods which are followed as will be explained later, the various textured and colored simulated glass facets such as those marked 10″, 11″ and 12″ and ridges 13″, 14″ and 15″ are all regular and undistorted as in the original model even though the sheet bearing the art work has been converted from a planar one to a convex one as in FIG. 7. The preformed shell in FIG. 7 has an annular radial flashing 39 remaining after preforming. Register holes 40 are punched in the flashing and it is sheared off after the next step.

The next step is to injection mold a clear resin backing layer on the preformed shell 27 to produce an object having a thickness and rigidity similar to stained glass. This step is depicted in FIG. 8. Here the preformed shell 27 of FIG. 7 is set in the cavity of a female mold 45 such as is used in an injection molding machine. Mold 45 has a cavity 46 which is substantially complementary in shape to the external shape and contours of preformed shell 27. The mold halves have pins 41 extending through register holes 40 in flashing 39 to hold the preform in perfect registry while the resin backing layer is being molded to it. The mold cavity 46 surface contours are identical with the complementary contours of the preformed shell 27 which is set in the mold before the thicker resin substrate 47 is injection molded to the shell.

The substrate which is to be injection molded and bonded by fusion or adhesion to the preformed printed film or sheet 27 may be any of the resins out of which the preformed sheet is made provided it is rigid at the temperatures at which the object is used and, where the object is translucent as in this example, the substrate should be preferably molded from a clear resin. In cases where the substrate and formed sheet do not form a good bond naturally, a suitable adhesive may be applied to the surface of the preformed sheet before injection molding the substrate to it. If the adhesive is on the printed side of the preformed sheet, the adhesive must, of course, be compatible with whatever kind of ink is used for printing the art work on the sheet.

As shown in FIG. 8, a male mold 48 cooperates with mold cavity 46 to provide a space into which the substrate resin 47 is injection molded. Male mold 48 has a rather smooth external surface so that the final molded product will be smooth inside. Male mold 48 is mounted to a movable block 49 with a plurality of machine screws 50. Block 49 has a bore 51 that is coaxial with a bore 52 in male mold 48. Bores 51 and 52 serve as a sprue for admitting molten resin for injection molding. The sprue preferably has a plurality of holes or runners radiating from it to the surface of the die such as the runners which are marked 53, 54 and 55. There are passageways such as the one marked 56 and other passageways such as the one marked 57 in the block for respectively conducting heat and cooling fluids for reasons which are known to those skilled in the art. Block 45 also has holes or passageways such as those marked 58 and 59 which serve the same purposes. It should be noted that the edge of the male mold 48 is recessed so that when injection molding takes place, a radially inward directed boss 60 is formed on the injection molded part in this example.

The operational sequence for injection molding the substrate 47 is to insert preform shell 27 into the mold 45 when block 49 is retracted to carry mold 48 with it. Block 49 and male mold 48 which it carries are then advanced into female mold 45 at which time the mold parts may be heated. When the molds are closed, molten plastic is injected at high pressure through the sprue and substrate 47 is formed and bonded to preform 27.

It should be recognized that when the preform 27 is provided with substrate 47 in mold 45, there is no substantial forming or reshaping of the preform as in the prior art processes described earlier where a thin film is used for carrying the decorative printing. The relatively thick sheet used for the preform 27 not only contributes toward getting good registry between the printed art work during preforming, it also aids in maintaining the preform dimensionally and positionally stable during injection molding and the result is a product which is free of distortions in the art work when it is finished.

Figure 16:
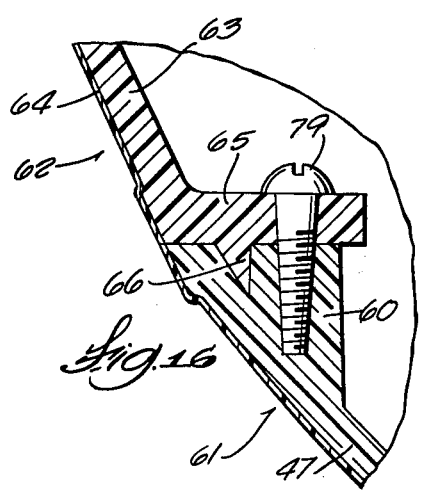
FIG. 16 is an enlarged fragmentary section of a flanged joint for connecting axially adjacent parts to each other to form the more complex nearly hemispherical object depicted in FIG. 14.

One of the integral bosses 60 at the rim of the molded shell and substrate composite 61 in FIG. 9 is shown in detail and in section in FIG. 16. These bosses are useful for coupling the hollow part 61 to another molded composite part for assembling a more complex or larger object. A fragment of another part of the assembly is marked 62 in FIG. 16. It is annular and has an injection molded substrate 63 and a preformed surface sheet 64 comparable to the substrate 47 and a preformed layer 27 as the part 61 in FIG. 9. In FIG. 16, annular part 62 has a radially inwardly extending flange 65 on which there is a beveled prong 66 that extends into a complementarily shaped socket in boss 60 to provide interlocking and compel alignment of parts 61 and 62 when they are fitted together. The parts are joined permanently with screws, such as the one marked 67, which screw into the respective bosses 60. The joint which is depicted in FIG. 16 is a horizontal joint in this example although it could be used in the vertical mode as well. It assures that areas on adjacent molded parts 61 and 62 will join flushly with each other so that no seam will be visible to the eye.

FIG. 13 shows an exploded view of concave composite part 61 as in FIG. 9, associated with four arcuate sections 70, 71, 72 and 73. Sections 70-73 are also made to simulate leaded stained glass. These sections are formed in suitable molds by the same method used to form the composite molded product depicted in FIG. 9. Of course, the molds will be appropriate in shape and size to the shape of the sections. Typical section 73 in FIG. 13 has upper and lower radially inwardly extending flanges 74 and 75 and simulated stained glass facets 76 together with simulated lead joints 77 on its side. The lower flange 75 of each segment has a plurality of notches or holes 78 which are used to fasten the sections to the bowl-shaped molded composite 61. The sections 70-73 in FIG. 13 are arranged in a circle as in FIG. 12 and disposed on the bowl-shaped part 61 in FIG. 13.

Figure 14:
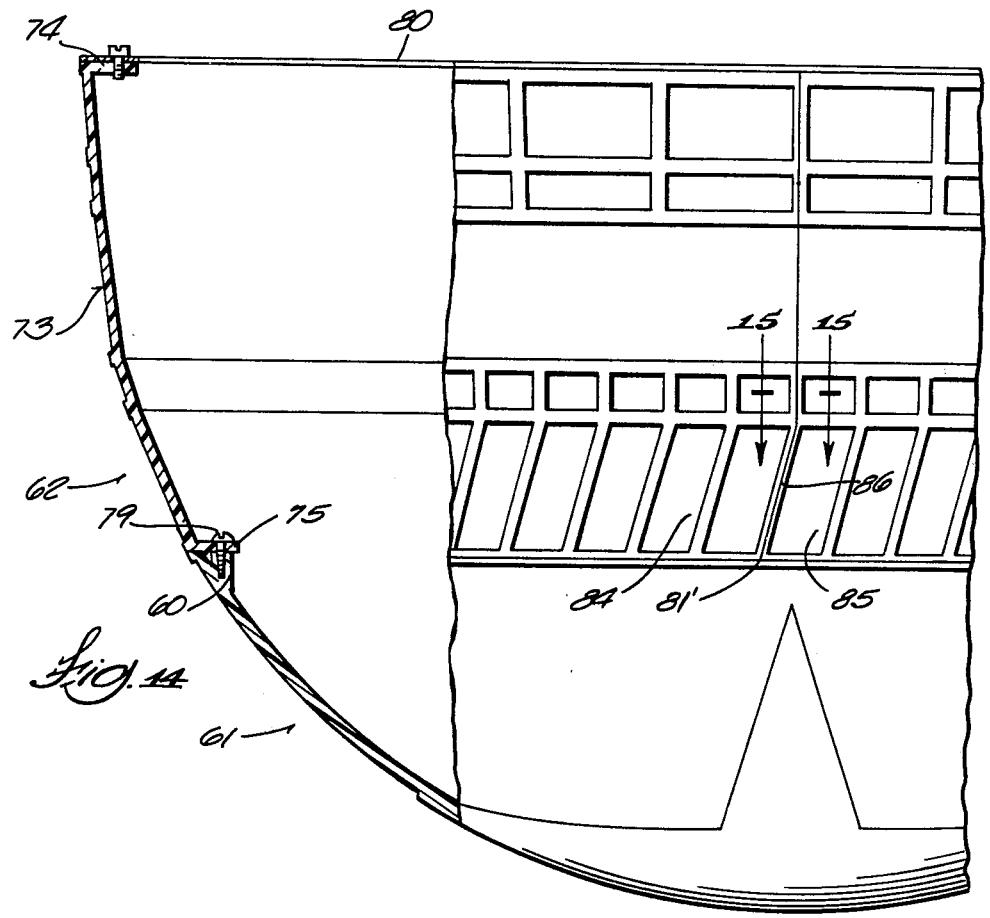
FIG. 14 shows the parts of FIG. 13 in their assembled condition.

As suggested in FIG. 12, screws such as those marked 79 may be inserted through notches 78 in the flange 75 to join the sections 70-73 in a circular arrangement to the part 61 as illustrated in FIG. 14.

In FIG. 14, a part of the assembly is broken away to illustrate how the screws 79 pass through notched flange 75 and into the bosses 60. Also in FIG. 14, one may see how the upper flange 74 of the sections is used to fasten a cover plate 80 to the assembly. Although it is not shown, the cover plate may be provided with an access door to the interior of the large, essentially hemispherical, simulated stained glass object depicted in FIG. 14. Also not shown are lamp sockets which may be mounted interiorly of the FIG. 14 assembly. When the lamps are on, the assembly is illuminated and presents a multicolored appearance to the observer which makes it look even more like genuine stained glass having leaded joints between facets.

Figure 15:
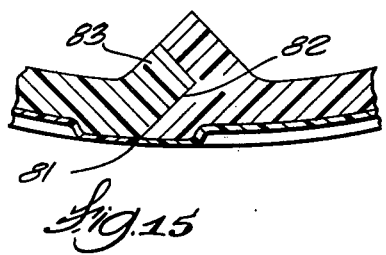
FIG. 15 is a fragmentary and sectional view of a joint in the assembly of FIG. 14 and is taken along a line corresponding with 15—15 in FIG. 14.

Since the annulus 62 in FIG. 14 is formed of arcuate sections 70-73, there must necessarily be vertical joints between them at final assembly. One of the joints is marked 81 in FIG. 14. A section through it is shown in FIG. 15. Here one may see that the ends of adjacent sections are formed for interlocking with each other. One end has an L-shaped notch 82 and the other has a complementary tongue 83 which fits into the notch and is so dimensioned that a smooth joint 81 is formed exteriorly of the assembly. Note in FIG. 14 that the joint has an angulated part 81' lying between two adjacent simulated stained glass facets 84 and 85 and coincident with the dark opaque simulated lead joint 86. The manner in which all joints in the large hemispherical object of FIG. 14 can be made with the method described above results in an object that appears to the eye to have been made in one piece. It is desirable to use a lead or soldered colored mastic in the joints and interfaces of the molded parts to prevent light leaks in the joints and to help hold the parts together during shipment.

Now that the general features of the new method have been described, more specific details will be given on intermediate steps, materials and dimensions as they are applicable.

The manner in which the art work on the preformed sheet 27 is processed to avoid distortion of the decorative matter comprised of simulated glass chips and lead joints when the art work is projected to a nonplanar object will be discussed first. It is well known that when art work developed on a flat sheet is transferred to a convex or concave surface, distortion of the art work will be noticed in the curved object. A known method for avoiding distortion in the final product will now be discussed in reference to FIGS. 10 and 11. The distortion we are here concerned with is that which would result from printing a faithful reproduction of the art work on a flat plastic sheet 27 and then vacuum preforming the plastic sheet into the shell depicting in FIG. 7. In an object having the shape of the one in that figure, the greatest amount of stretching of the sheet during preforming can be expected to occur on the side adjacent flange 39 and the amount of stretching and distortion will diminish toward the end of the concave object.

Distortion of the art work in the final product is avoided by using a test plastic sheet having a grid or regularly spaced points marked on it as in FIG. 10. A grid sheet preferably having the same thickness as the sheet which is to be preformed is used. The grid sheet, marked 90 in FIG. 10, is vacuum formed as in FIG. 6 to produce the object in FIG. 7. The straight lines forming the grid will then, at least in some areas, be stretched or distorted and the spacing between the points of intersection of the lines will change. Of course, any area that has relief such as the simulated lead lines or letters that may be impressed in the preform will be present and faithfully reproduced when the grid sheet is preformed.

The preformed grid is then projected back orthogonally to another planar grid sheet in which case it will be found that in many areas the points of intersection of the grid lines and the grid lines themselves will no longer coincide. The distorted points are then connected by an artist drawing lines from one point to the next. In FIG. 11, as an example, the simulated stained glass letter S, marked 91, stands out in relief on a preform that is to be used in an advertising device. It is assumed to be located where the sheet material undergoes substantial stretching during preforming. The S in relief will have an accurate shape, of course, but if there were ink on the preform which was supposed to lie exclusively behind the S, it might be stretched into an adjacent zone and the distortion would be evident in the final product. However, when the letter S, shown in dotted lines in FIG. 11, is projected back and the points are connected, the letter appears to become pre-distorted. After all the points are connected to establish the outlines of the simulated stained glass facets, the lead joints and letters or other decorations, if any, the different colored inks are painted onto the appropriate zones to complete the art work. The art work is then photographed sequentially using a known photoresist process to develop as many negatives which each have the different color areas on them. Silk screens are made from these sheets or plates so the colors may be applied to a single sheet sequentially to develop the pre-distorted art work before the plastic sheet is preformed in accordance with the step depicted in FIG. 6.

I claim:

1. A method for making generally non-planar contoured simulated stained glass articles composed of an array of simulated stained glass facets the majority of which are non-coplanar with respect to each other, said facets being bounded by simulated solder joints between them, said method comprising the steps of: coating a sheet of resin having a thickness in the range of 0.015 inch to 0.025 inch with materials which define an array of facets and bounding simulated solder joints having the colors desired in the finished article, providing a first mold having a surface conforming generally with the contour of said article and said surface having planar areas arranged in correspondence with said facets and grooves arranged in correspondence with said joints and with a majority of said planar areas being non-coplanar with other said areas, forming said resin sheet under the influence of heat and pressure to the contour of said first mold surface to conform said array of facets on said sheet with corresponding planar areas in said mold surface and to conform said joints on said sheet with corresponding grooves in said mold surface so that said joints are produced in relief, said resin sheet being generally concave on one side and substantially correspondingly convex on its other side after said forming, disposing the concave and convex sheet produced in the preceding step in a second mold with the convex side of said sheet registering with a correspondingly concave surface in the second mold, said concave surface having planar areas and grooves corresponding with the planar areas and the relief joints on said concave and convex sheet for said relief joints and said planar areas on said concave and convex sheet to register accurately with said areas and grooves, respectively, on said second mold and, then injecting a layer of fluid resin material on a side of said concave and convex sheet opposite the side having said relief for said material to form a layer that is bonded to said concave and convex sheet to to produce a thick and rigid article when said resin material solidifies.

2. The method as in claim 1 wherein said sheet of resin material out of which said preform is made has a thickness of about 0.020 inch.

3. The method as in claim 1 including molding fastening means on an article in the mold in which said injection molding occurs to enable fastening one or more articles to one or more other articles to produce an assembly of substantial size.

* * * * *